United States Patent [19]
Zimmer

[11] 3,778,175
[45] Dec. 11, 1973

[54] SNAP LOCKING STRUCTURAL JOINT ASSEMBLY

[76] Inventor: Ernest C. Zimmer, Rte. 2, P.O. Box 307, Wellsburg, N.Y.

[22] Filed: June 4, 1971

[21] Appl. No.: 150,002

[52] U.S. Cl........... 287/54 C, 52/645, 287/20.92 C, 52/665
[51] Int. Cl............................................. F16b 7/22
[58] Field of Search............. 287/54 A, 54 B, 54 C, 287/189.36 H, 189.36 R, 20.92 D, 20.92 C; 52/645, 656, 665, 475

[56] References Cited
UNITED STATES PATENTS
| | | | |
|---|---|---|---|
| 3,561,801 | 2/1971 | Chiu | 287/189.36 H |
| 3,485,519 | 12/1969 | Chiu | 287/189.36 H |
| 3,642,310 | 2/1972 | Hudson | 287/54 A |
| 3,061,055 | 10/1962 | Nijhuis | 287/189.36 H |
| 3,458,052 | 7/1969 | Kann | 287/54 A X |
| 3,612,585 | 10/1971 | Mayr | 287/54 A X |

Primary Examiner—James R. Boler
Assistant Examiner—Wayne L. Shedd
Attorney—Shoemaker & Mattare

[57] ABSTRACT

A snap-locking structural joint assembly and method of assembling same comprising an elongate structural connecting member having longitudinally extending channel means in at least one side thereof and a fastening clip means having flange means thereon adapted to be received in said channel means to secure said fastening clip to said elongate structural member, and locking means operatively associated with opposite, spaced apart legs of said fastening clip means to lock said fastening clip means to a second elongate structural member for releasably joining said second elongate structural member to said first elongate structural member.

17 Claims, 16 Drawing Figures

INVENTOR
ERNEST C. ZIMMER
BY Shoemaker and Mattare
ATTORNEYS

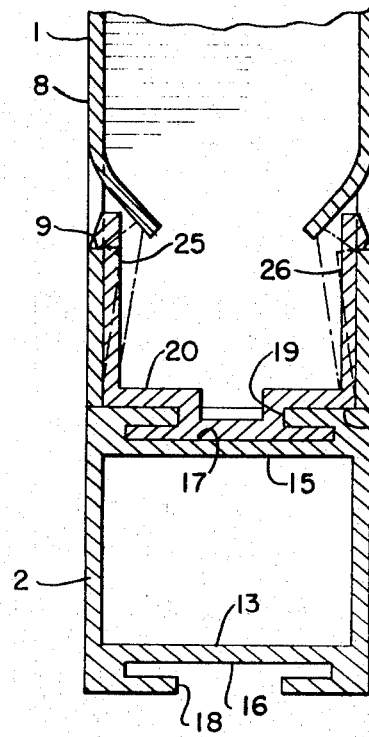
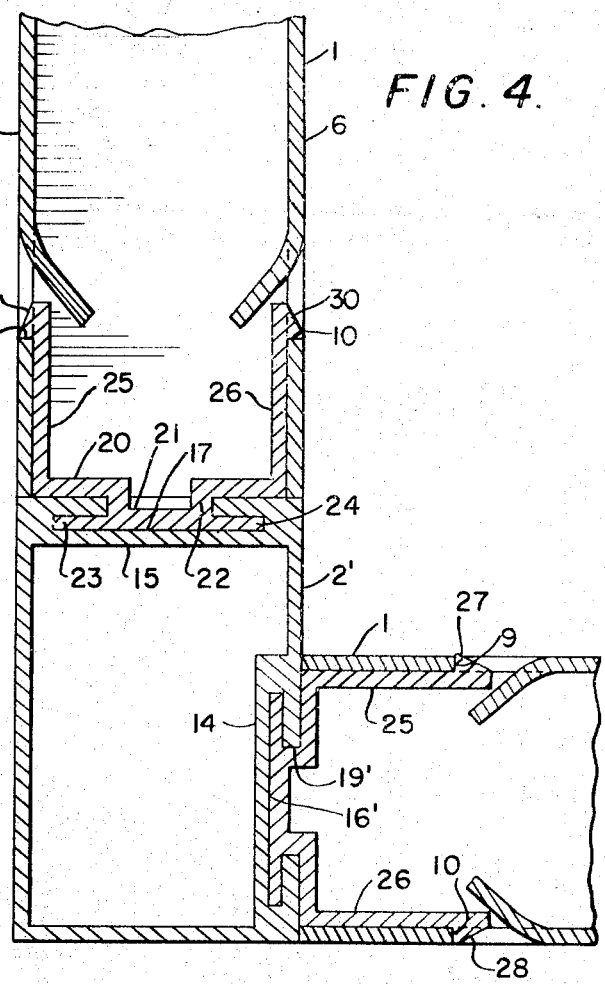
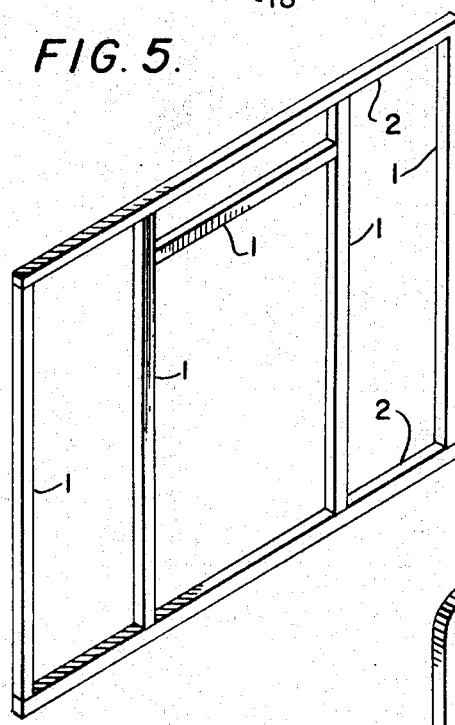
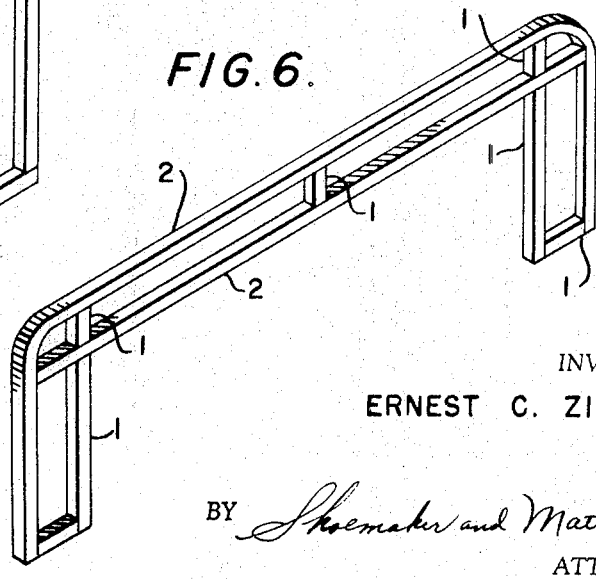
INVENTOR
ERNEST C. ZIMMER
BY *Shoemaker and Mattare*
ATTORNEYS

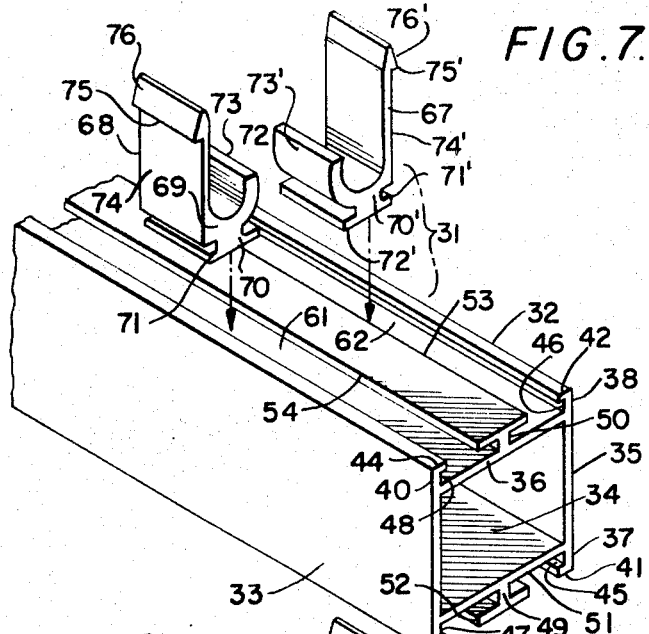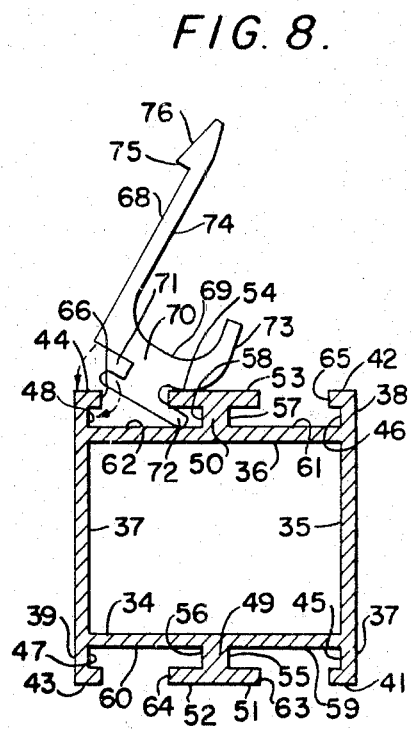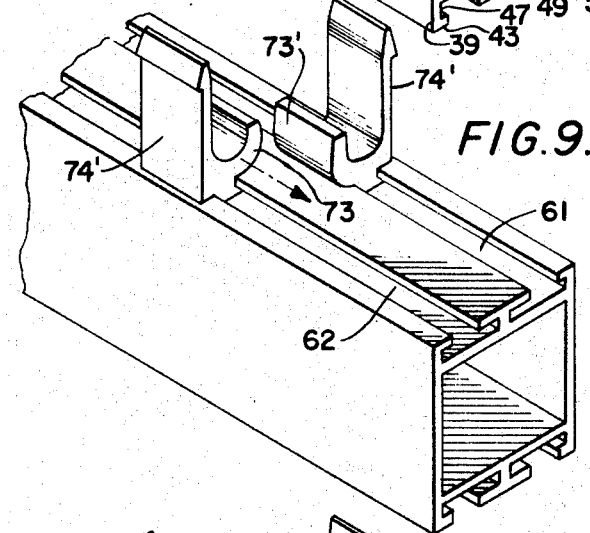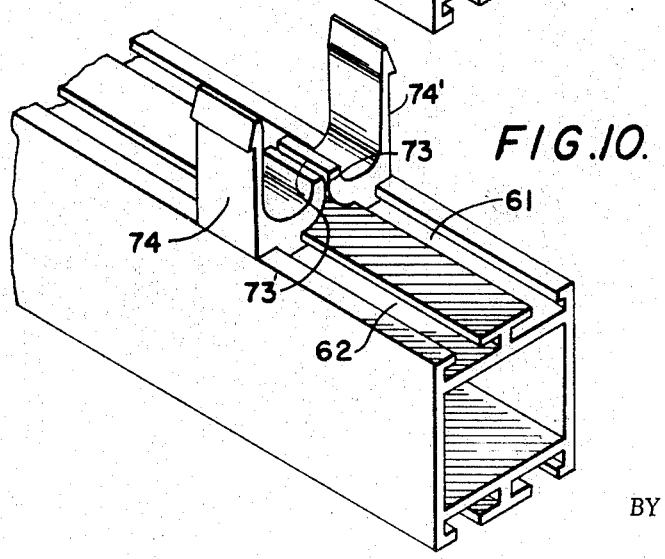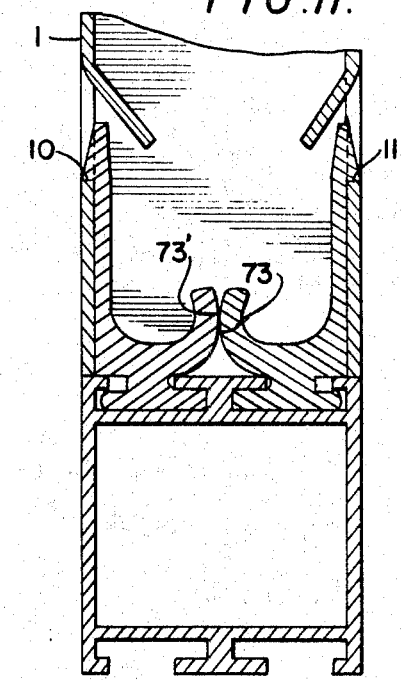
INVENTOR
ERNEST C. ZIMMER
BY *Shoemaker and Mattare*
ATTORNEYS

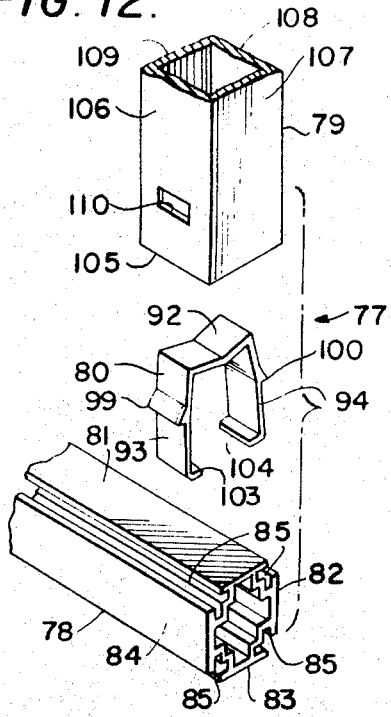
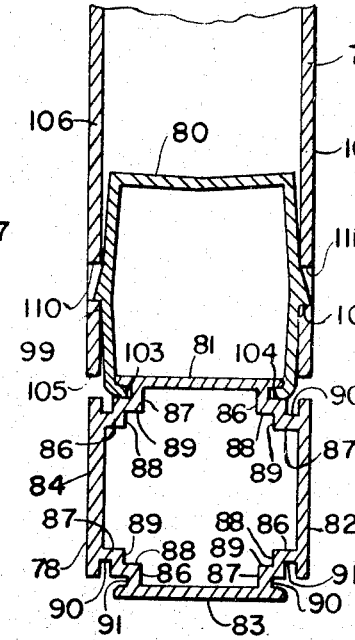
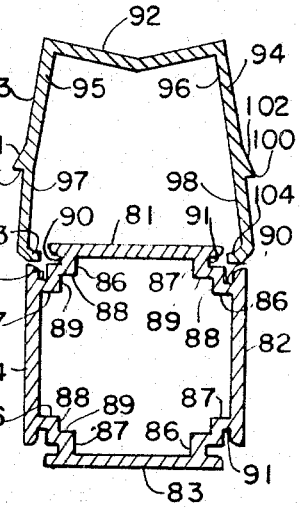
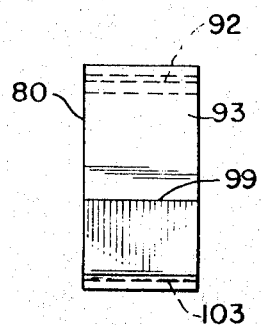
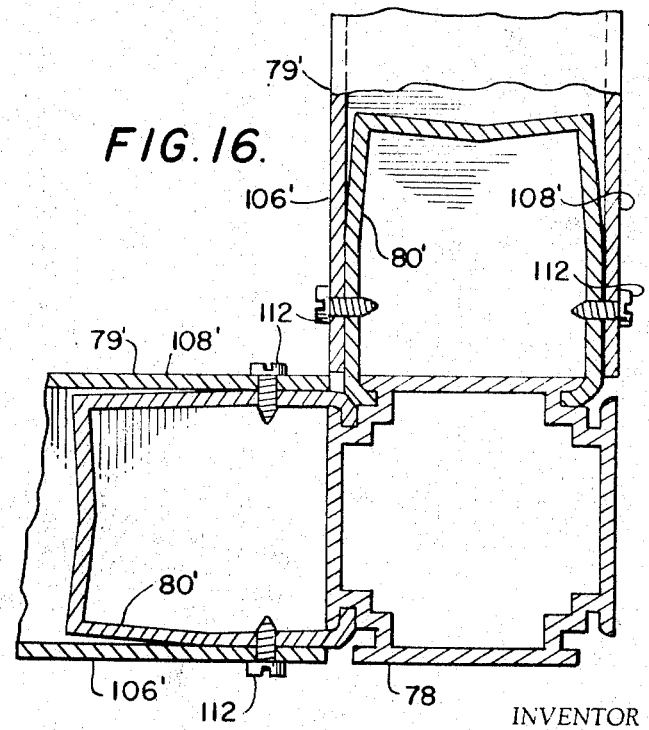

SNAP LOCKING STRUCTURAL JOINT ASSEMBLY

BACKGROUND OF THE INVENTION

The present invention relates to a new and novel snap-locking structural joint assembly which is lightweight in construction and which, more particularly, relates to a manually assembled type of structural joint interconnection.

The invention is especially suitable for assembling various structural assemblies, such as canopies and awnings; storage or utility buildings; wall and office partitions; truck bodies; portable swimming pool wall constructions; camper tops; motor homes; mobile homes; car ports; skirting and accessories; fencing; buildings, such as patio lockers, storage sheds and shelters; shelving and storage racks; furniture; car top carriers; home remodeling equipment, such as installation apparatus for suspended ceilings and the like; toys; ornamental iron work, and so forth. It is important with these applications that the elements be quickly and easily assembled and once in assembled position positively locked in place yet at the same time permitting them to be separated when and if desired.

With the present invention, a snap-locking fastening clip means is provided which enables the various structural elements to be readily assembled in positively locked together relationship and yet wherein the elements may be quickly and easily disassembled if desired.

In general the invention comprises a snap locking structural joint assembly including a first elongate structural member having recess means therein and fastening clip means having a pair of oppositely directed yieldable projections thereon received in said recess means holding said clip means to said structural member in predetermined axial position. Releasable means is cooperatively connected with said fastening clip means and a second structural member releasably securing said second structural member to said clip means and to said first structural member in predetermined axial position relative thereto.

In one form of the present invention, an elongate structural member has at least one channel means in at least one side thereof extending longitudinally of the structural member and adapted to receive therein oppositely directed flanges on the base portion of a generally U-shaped clip fastener, the opposite legs of which include snap-locking means adapted to snap into cooperating recesses in an open end portion of another elongate structural member for securing the structural members together in assembled relationship without requiring separate fasteners or the like.

A second form of the invention comprises an elongate structural member having at least a pair of parallel, longitudinally extending channel means on at least one side thereof adapted to receive oppositely directed flanges on the base of a generally hook-shaped clip fastener, with a substantially identically constructed hook-shaped clip fastener received in the adjacent channel means in said at least one side of said structural member. The clip fasteners each have a relatively short leg and a relatively elongate leg, the short leg of each clip fastener having an arcuately shaped surface adapted to cooperate with the arcuately shaped surface of the adjacent clip fastener when the clip fasteners are assembled in the channel means to provide a camming effect wherein the clip fasteners are positively locked in said channel means. The elongate legs of the clip fasteners are disposed adjacent opposite edges of said structural member and include snap locking means on the end thereof adapted to be received in a cooperating snap-locking recess in an open end of an associated structural member for locking the structural members together without requiring the use of separate fasteners or welding or the like. The hook-shaped clip fasteners may be assembled in the channel means at any longitudinal position thereof and need not be inserted through the end of the channel means.

A third form of the invention is illustrated in FIGS. 12–15. In this form of the invention, a generally U-shaped fastening clip means with opposite, substantially parallel legs having yieldable projections or inturned flange means thereon is adapted to be releasably snap locked to a first tubular connecting member with the flange means on the legs received in complementary recess means or channel means extending along the side of the first connecting member. Outwardly directed, snap locking shoulder means is on each leg for snap locking cooperation with complementary snap locking means on a second tubular connecting member for readily releasably joining said second connecting member to said first connecting member. The fastening clip means may be assembled to the channel means of the first connecting member in any axial position therealong and need not be slid into the channel means from one end thereof. Further, the fastening clip means illustrated in these figures does not require any separate fasteners to releasably join the first and second connecting members together, and a pair of clip means may be assembled to the channel means at the same axial position along the first connecting member without interference therebetween.

In FIG. 16, a fourth form of the invention is illustrated and is identical to the fastening clip means shown in FIGS. 12–15, except that a separate fastening means such as a screw or rivet or the like is used for joining the second connecting member to the fastening clip means rather than the snap locking shoulder means shown in FIGS. 12–15.

In both the third and fourth forms of the invention, the legs of the U-shaped fastening clip are normally slightly outwardly flared or spread apart and are urged inwardly toward one another with the flange means received in the channel means when the second connecting member is positioned on the fastening clip means.

The elongate structural members and clip fasteners may be formed of any suitable material such as plastic or metal such as aluminum or the like, wherein the clip fasteners may be flexed, thereby permitting sufficient deformation to move the elements into operative relationship without requiring excessive manual effort.

The structural members and clip fasteners do not require any special tooling in the manufacture thereof and may be simply manufactured as an extrusion or as a roll-form shape or the like.

Moreover, there is no alignment problem axially of the elements since they may be interconnected with one another in any relative axial relationship with one another.

Even though the structural members and clip fasteners are positively locked to one another in the sense that the clip fasteners cannot be withdrawn through the opening provided in the channel means, the channel means and clip fasteners can be separated, if desired, by sliding the flange means out of the channel means in one form of the invention or by pivoting the clip fasteners and lifting the flanges out of the channel means in any axial position of the structural member in the second form of the invention. In the third and fourth forms of the invention, the clip fastener can be removed from the channel means without sliding it endwise thereof if the second connecting member is first removed.

OBJECTS OF THE INVENTION

An object of this invention is to provide a snap-locking structural joint assembly, which is simple and inexpensive as well as light weight in construction and yet which at the same time is sturdy and easy to use.

Another object of this invention is to provide a snap-locking structural joint assembly which is readily manually snapped into operative position and which positively locks in place and yet which at the same time can be readily separated when desired.

Still another object of the invention is to provide a snap-locking structural joint assembly wherein the elements may be locked into place in any relative axial position, thereby presenting no alignment problem when assembling the apparatus.

A still further object of the invention is to provide a snap-locking structural joint assembly wherein a two-piece fastening clip means is provided having means enabling the clip means to be assembled to a structural member at any position along its length and without requiring the clip means to be inserted into a channel means at one end of the structural member and slid along its length to a desired operative position.

Yet another object is to provide a snap-locking structural joint assembly wherein a fastening clip means is provided having means thereon for releasably joining together a plurality of connecting members without requiring the use of separate fasteners or the like.

An even further object is to provide a snap-locking structural joint assembly wherein a fastening clip means has snap-locking flange means thereon for interengagement with snap-locking means on a first connecting member and wherein a second connecting member engages said fastening clip means for maintaining it in locked interengagement with said first connecting member.

BRIEF DESCRIPTION OF THE DRAWINGS

FIG. 3 is a sectional view taken along the line 3—3 in FIG. 1, showing the manner in which the opposite legs of the U-shaped fastening clip are flexed inwardly during installation and then locked or snapped into position.

FIG. 4 is a sectional view similar to FIG. 3, showing an alternate arrangement of channel means and attachment of a structural member at right angles to the joint assembly.

FIG. 5 is a top perspective view of a structure assembled by means of a snap-locking structural joint assembly of the present invention.

FIG. 6 is a view similar to FIG. 5 of a different structure assembled by means of the present invention.

FIG. 7 is an exploded perspective view of a second form of the invention.

FIG. 8 is a sectional view illustrating the manner in which one of the clip fasteners of FIG. 7 is inserted into the channel means.

FIG. 9 is a top perspective view illustrating the manner in which the clip fasteners in the second form of the invention are oppositely positioned during assembly.

FIG. 10 is a top perspective view similar to FIG. 9, illustrating the clip fasteners in operative position.

FIG. 11 is a sectional view illustrating the manner in which the clip fasteners in the second form of the invention cooperate to hold the structural members together in assembled relationship.

FIG. 12 is an exploded perspective view of a third form of snap-locking structural joint assembly.

FIG. 13 is a view in section of the joint assembly of FIG. 12 with the parts in locked interengagement.

FIG. 14 is an exploded sectional view of a first connecting member and a fastening clip means about to be assembled thereto and showing the natural, spread apart condition of the legs of the fastening clip means.

FIG. 15 is a side view in elevation of the fastening clip of FIG. 12.

FIG. 16 is a view in section of a fourth form of the invention with a pair of second connecting members joined to a first connecting member by a pair of fastening clip means and wherein separate fastening means are used in conjunction with the fastening clip means.

DETAILED DESCRIPTION OF THE INVENTION

Figure 1:
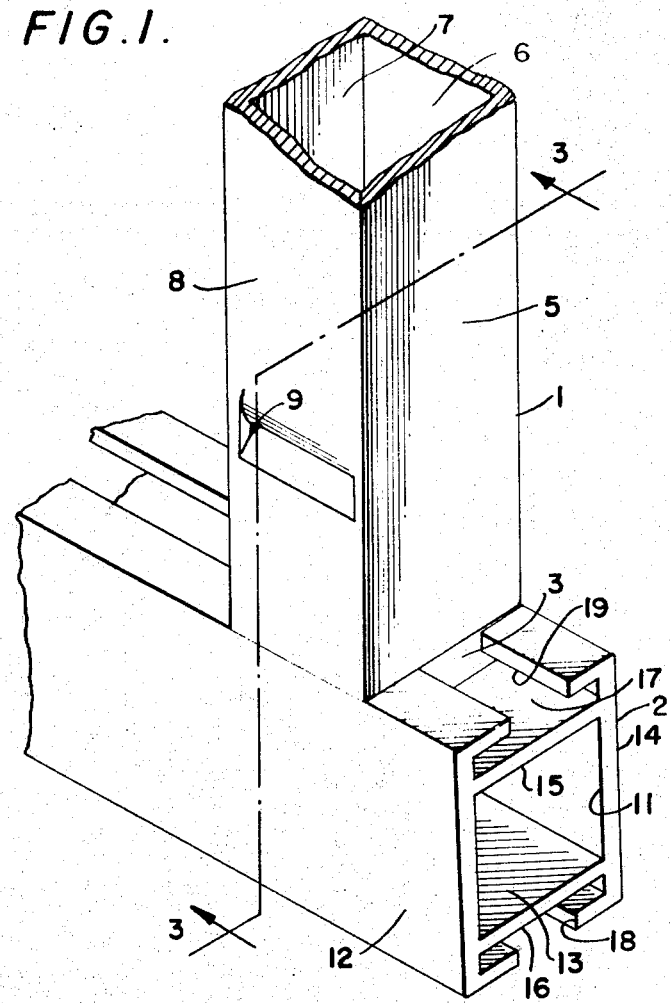
FIG. 1 is a top perspective view of one form of the invention showing a pair of structural members locked in assembled relationship by means of a snap-locking fastening clip.

Referring now to the drawings, wherein like reference numerals refer to like parts throughout the several views, a pair of structural elements or tubular connecting members 1 and 2 are illustrated in assembled relationship in FIG. 1. In this figure, tubular connecting member 1 is shown assembled to tubular connecting member 2 in a right angular relationship with the end of member 1 abutting against the side of member 2 and spaced slightly inwardly from the end of member 2 along one side thereof. It is to be understood that connecting member 1 could be axially positioned at any location along connecting member 2.

Figure 2:
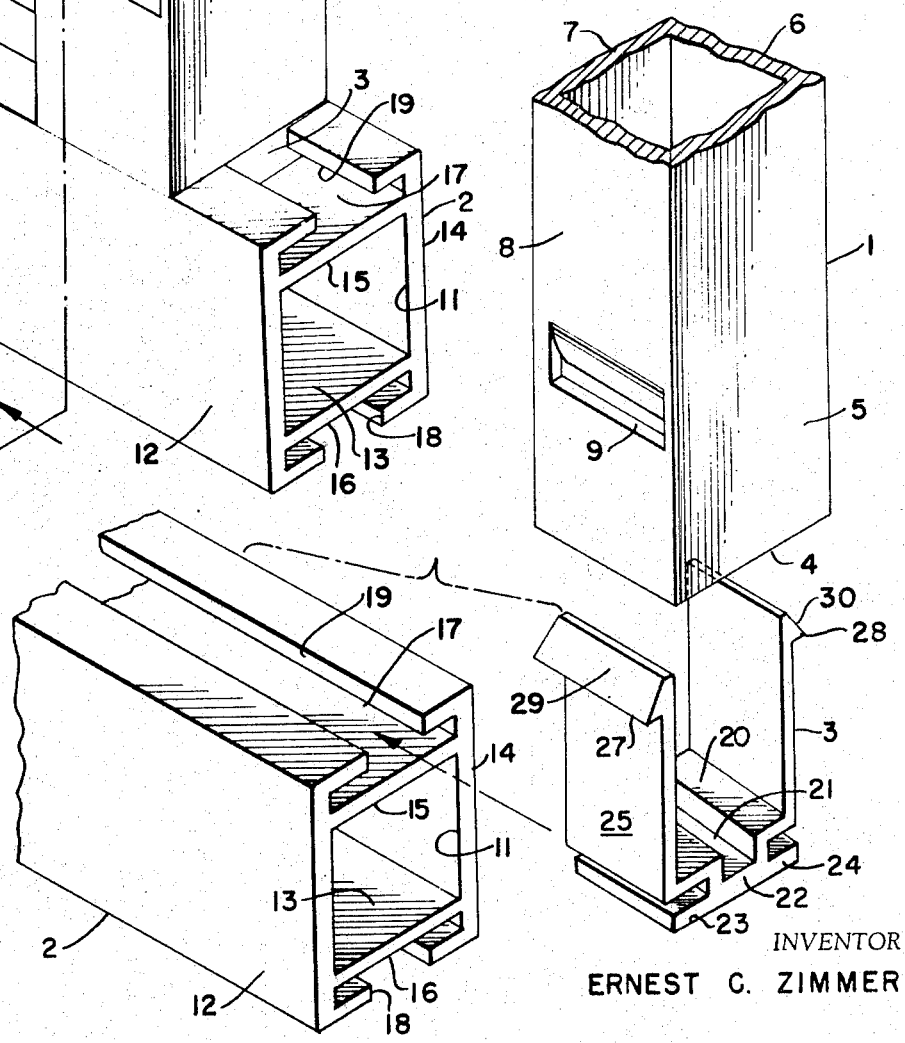
FIG. 2 is an exploded perspective view of the structure shown in FIG. 1.

Referring now also to FIGS. 2, 3 and 4, details of construction of the tubular connecting members 1 and 2 and a clip fastener 3 for joining the connecting members 1 and 2 together can be seen.

Tubular connecting member 1 is generally rectangular in cross-section and has an open end 4 and opposed flat side walls 5, 6, 7, and 8. A pair of slots or recesses 9 and 10 are punched or otherwise suitably formed in the opposite side walls 8 and 6, respectively, and they are spaced a predetermined distance inwardly from the end 4 of tubular member 1.

Tubular member 2 is similarly generally rectangular in cross-section and has an open end 11 and opposed flat side walls 12, 13, 14 and 15. The edges of opposite side walls 12 and 14 extend outwardly beyond and at right angles to the plane of walls 13 and 15 and are turned inwardly at their marginal edges over and parallel to the walls 13 and 15. The edges terminate short of one another to define channel means 16 and 17 having a narrowed opening 18 and 19 therein, respectively.

The clip fastener 3 for connecting the tubular members 1 and 2 together is generally U-shaped in cross-section and includes a base portion or wall 20 having a channel 21 extending the width thereof and a boss 22 on the underside thereof with a pair of opposite, laterally extending flanges 23 and 25 extending toward and terminating short of the opposite sides of the base portion 20. A pair of upstanding, generally parallel legs 25 and 26 extend from opposite edges of the base portion 20 and terminate at their upper edges in outwardly directed snap-locking flanges or lips 27 and 28. The outer surfaces or edges of the lips or flanges 27 and 28 are beveled or wedge shaped to define outwardly facing, sloping surfaces 29 and 30 to aid in inserting the legs 25 and 26 within the open end of a connecting member 1.

In use, the clip member 3 is assembled to the tubular member 2 by sliding the opposed flanges 23 and 24 into the recesses defined by the channel 16 or 17 to a desired position axially of the tubular member, such as shown in FIG. 1. Tubular member 1 is then pushed down over the legs 25 and 26, engaging the sloping surfaces 29 and 30 and flexing the legs inwardly to the position shown in phantom lines in FIG. 3, the channel 21 aiding or increasing the ease with which the legs 25 and 26 are flexed inwardly. The tubular member 1 is then pushed downwardly over the legs until the snap-locking flanges 27 and 28 come into registry with slots 9 and 10 in tubular member 1, at which time the snap-locking flanges snap into position in the slots positively locking the tubular members 1 and 2 together.

In FIG. 4, a slightly modified arrangement is shown wherein channel means 17 and 16' are provided in adjacent sides 15 and 14 of a channel member 2'. In this arrangement, a pair of tubular members 1 and 2 would extend at right angles to one another rather than parallel to one another as in the FIG. 1 embodiment.

Referring now to FIGS. 7 through 11, a modified snap-locking structural joint assembly 31 is shown. A tubular connecting member 32 having a generally rectangular cross-sectional configuration and opposite flat side walls 33, 34, 35 and 36 has its opposite side walls 33 and 35 extended outwardly at 37, 38 and 39, 40 beyond and at right angles to the plane of side walls 34 and 36, respectively, and then turned inwardly at 41, 42 and 43, 44 over the side walls 34 and 36, respectively, at the edges thereof to define relatively shallow recesses or channels 45, 46, 47 and 48, at the corners of member 32, respectively.

Relatively short, upstanding walls 49 and 50 extend perpendicularly from the center of the side walls 34 and 36, respectively, and a pair of oppositely directed, laterally extending flanges 51, 52 and 53, 54 extend from opposite sides of the free edge of the walls 49 and 50, respectively, toward the opposed flanges 41, 43 and 42, 44, respectively, to define recesses or channel means 55, 56 and 57, 58 therein substantially twice as deep as the recesses or channel means 45, 46, 47 and 48.

The aforesaid wall portions and flanges define a pair of side-by-side, longitudinally extending, parallel channels 59, 60 and 61, 62 in the walls 34 and 36, respectively, having openings 63, 64 and 65 and 66 therein.

The two-piece clip fastening means comprises a pair of substantially identical, hook-shaped clip fasteners 67 and 68, only one of which will be described in detail, the same reference numerals primed being applied to the other. The clip fastener 68 has base portion 69 with a relatively short boss 70 extending from the bottom thereof and substantially equal in width to the width of the clip fastener. A pair of flanges 71 and 72 extend laterally in opposite directions from the bottom of the boss 70, the flange 72 being substantially twice as wide as the opposite flange 71. A relatively short, arcuate wall portion 73 extends upwardly from one edge of the base portion 70 and an elongate wall portion 74 extends upwardly from the opposite edge of the base portion 70 generally parallel to arcuate wall 73. The outer edge of wall 74 terminates in an enlarged portion defining a snap-locking shoulder or lip 75 with a wedge shaped or beveled surface 76 similar to the lip and bevel surface in the previously described embodiment.

In use, the clip fasteners 67 and 68 of FIGS. 7 through 11 are assembled to the tubular connecting member 32 by inserting the large flanges 72 and 72' through the openings 66 and 65 into the channel means 62 and 61 and into the enlarged recesses 58 and 57 adjacent the center of the tubular connecting member 32, with the short, arcuately shaped walls 73 and 73' lying over the flanges 54 and 53, respectively, and projecting upwardly therefrom. The longer wall portions 74 and 74' lie over and extend upwardly from the flanges 44 and 42. The clip fasteners 67 and 68 are then pivoted downwardly with flanges 71 and 71' passing through the openings 61 and 62 and into the recesses 48 and 46, respectively. As seen in FIGS. 7 and 8, the clip fasteners 67 and 68 are inserted into the channels 61 and 62 spaced axially apart from one another along the tubular member 32. The two clip fasteners are then moved axially into alignment with one another with the arcuate walls 73 and 73' of the opposed fasteners 67 and 68 in abutting relationship with one another. Tubular connecting member 1 is then passed downwardly over the walls 74 and 74' just as in the previous embodiment and the engagement of the walls of tubular connecting member 1 with the beveled surfaces 76 and 76' on the walls 74 and 74' of the clip fasteners causes the walls 74 and 74' and clip fasteners to be rocked inwardly with the abutting engagement between the adjacent arcuate walls 73 and 73' effecting a camming action to securely lock the clip fasteners into position and to securely hold tubular connecting member 1 to tubular connecting member 32. As can be seen, the two-piece clip fastener permits the clip fasteners and an associated tubular connecting member 1 to be attached to tubular connecting member 32 anywhere along its length without requiring the clip fasteners to be inserted into the channel means at one end of the tubular connecting member 32 as in the previous embodiment. Rather than the channel means being on opposite side walls 34 and 36, as shown, they could be disposed at right angles to one another as depicted in FIG. 4, for example, with reference to the first described embodiment.

Referring now to FIGS. 12 to 15, a third form of snap-locking structural joint assembly is indicated generally at 77 and comprises a first elongate tubular connecting member 78, a second elongate tubular connecting member 79 and a generally U-shaped fastening clip means 80.

The first connecting member 78 is substantially rectangular in cross section and includes opposite, generally parallel spaced side walls 81, 82, 83 and 84. The side walls terminate short of one another at their adjacent edges to define recesses or channel means 85 at each of the corners of the connecting member 78. Relatively short wall portions 86 and 87 extend perpendicularly from each side wall spaced inwardly from the edges thereof and the wall 86 at one edge of a side wall 81, for example, is connected with the wall 87 at the adjacent edge of a side wall 84 by a pair of relatively short, mutually perpendicular walls 88 and 89. The edge of a side wall and a pair of perpendicular walls 86 and 88 define a first channel 90 at one corner of the connecting member and the opposite edge of the side wall and a pair of walls 87 and 89 define a second channel 91 at the opposite corner of the connecting member. The channels 90 and 91 at adjacent edges of a pair of adjacent side walls 81 and 84, for example, are perpendicular to one another and open outwardly beyond the outer edges of the adjacent side walls.

The U-shaped clip fastening means 80 comprises a bight portion 92 bent or deflected downwardly in the middle thereof into the shape of a shallow V and a pair of slightly outwardly flared legs 93 and 94 extending from opposite edges of the bight portion 92. Each leg 93 and 94 is bent slightly inwardly toward the opposite leg at approximately the mid-portion thereof to define a first portion 95 and 96, respectively, extending substantially perpendicularly from the opposite edges of the bight portion and a second portion 97 and 98, respectively, extending at a slight angle from the portions 96 and 97 toward the opposite leg. A pair of outwardly projecting snap-locking shoulder means 99 and 100 are formed on the opposite legs 93 and 94 at the mid-portions thereof and include an upwardly and inwardly inclined surface 101 and 102, respectively. A pair yieldable projections or inturned flanges 103 and 104 are on the bottom edges of the legs 93 and 94 for receipt in a pair of channels 90 and 91 at opposite corners of the first connecting member 78 to joint the fastening clip 80 to the connecting member 78.

The second connecting member 79 includes an open end 105 and opposite spaced side walls 106, 107, 108 and 109. A pair of openings 110 and 111 are punched or otherwise suitably formed in a pair of opposite side walls 106 and 108 spaced inwardly from the open end thereof for snap-locking registry with the shoulders 99 and 100 on the fastening clip 80 to lock the second connecting member 79 to the fastening clip 80 and thus to the first connecting member 78.

In use, the fastening clip 80 is positioned with the flanges 103 and 104 in alignment with a pair of channel means 90 and 91 as seen in FIG. 14. The second structural member 79 is then slid down over the clip means 80, and the opposite side walls 106 and 108 deflect the legs 93 and 94 inwardly, urging the flanges 103 and 104 into the channels 90 and 91. The sloping surfaces 101 and 102 cause the side walls 106 and 108 to cam the legs inwardly until the shoulders 99 and 100 come into registry with the openings 110 and 111, and the legs then flex or snap outwardly and the shoulders lock behind the bottom edges of the openings 110 and 111. The first and second connecting members 78 and 79 and the clip fastener 80 are then securely locked together as seen in FIG. 13.

Referring now to FIG. 16, a fourth form of the invention is illustrated and is substantially identical to the form of the invention illustrated in FIGS. 12 to 15, except that the shoulder means 99 and 100 are omitted from the legs 93' and 94' of the clip fastener 80' and the openings 110 and 111 are omitted from the side walls 106' and 108' of connecting member 79'. A pair of suitable fastening means such as rivets or screws or the like 112 are extended through the side walls 106' and 108' and the legs 93' and 94' to releasably join the second connecting member 79' to the clip fastener 80' and thus to the first connecting member 78. When a pair of second connecting members 79' are joined to a first connecting member 78 as seen in FIG. 16, the adjacent edges of the adjacent connecting members 79' are in tight abutting contact.

The joint may be secured by crimping the opposite edges of a side wall over the flanges 103 and 104 received in the channels 90 and 91.

FIGS. 5 and 6 illustrate typical structural assemblies which may be made with the tubular connecting members and clip fasteners of the present invention.

The tubular connecting members and the clip fasteners may be manufactured of any suitable material such as extruded aluminum or the like or they may be made of plastic or fiberglass and the like.

For certain applications, such as in furniture manufacturing and the like, wherein a smooth joint is desired, a sectional channel, not shown, may be used to provide a concealed joint covering the die punch slot in the tubular connecting members.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A structural joint assembly including a pair of elongate tubular structural members joined together in right angular relationship, comprising a first elongate tubular structural member of substantially rectangularly shaped cross-section and with opposite flat walls and opposite corners, said walls terminating at their longitudinal side edges short of said corners and including inset wall portions defining part of an outwardly opening, closed bottom channel means at the corners, a pair of opposite walls extending at their opposite side edges beyond said inset wall portions and overhanging a portion of said channel means and comprising an outer wall of said channel means flush with a respective one of said pair of walls, so that said channel means open outwardly parallel to the plane of a respective one of said pair of walls, a second elongate tubular structural member of substantially rectangular cross-section and with an open end, a substantially U-shaped fastening clip means with a pair of spaced apart, resiliently yieldable legs frictionally engaged in said open end with a free end of each leg projecting out of said open end, said U-shaped fastening clip means each spanning a respective one of said pair of walls from one longitudinal edge to the other longitudinal edge thereof, an inturned flange on the free end of each leg and engaged in a respective channel means at opposite edges of one of said walls to releasably secure the second structural member to the first structural member in right angular relationship thereto.

2. A structural joint assembly as in claim 1, wherein snap-locking means are on said fastening clip means and complementary snap-locking means are on said second structural member, said snap-locking means being cooperatively interengaged.

3. A snap-locking structural joint assembly as in claim 28, wherein said U-shaped fastening clip means includes a bight portion and said pair of legs extend from opposite sides of said bight portion.

4. A snap-locking structural joint assembly as in claim 3, wherein said legs are slightly outwardly flared and said flange means extend generally perpendicularly therefrom toward one another.

5. A snap-locking structural joint assembly as in claim 4, wherein said snap-locking means on said fastening clip means comprises an outwardly projecting shoulder means on each leg between the ends thereof.

6. A snap-locking structural joint assembly as in claim 5, wherein said snap-locking means includes an inwardly tapered surface extending from said shoulder means toward said bight portion.

7. A snap-locking structural joint assembly as in claim 6, wherein said channel means includes a pair of channels extending at right angles to one another at each corner and opening outwardly beyond the adjacent edge of said flat side walls.

8. A snap-locking structural joint assembly as in claim 7, wherein each of said flange means is received in a respective one of said pair of channels at each opposite edge of one of said flat side walls.

9. A snap-locking structural joint assembly as in claim 8, wherein said snap-locking means on said second structural member comprises a pair of openings in opposite side walls thereof.

10. A snap-locking structural joint assembly as in claim 9, wherein said shoulder means are received in said openings.

11. A snap-locking structural joint assembly as in claim 10, wherein said legs of said U-shaped fastening clip are deflected inwardly toward one another when said second structural member is placed thereover.

12. A snap-locking structural joint assembly as in claim 3, wherein a separate fastening means is extended through opposite flat sides of said second structural member and through a portion of said fastening clip means.

13. A snap-locking structural joint assembly as in claim 12, wherein said legs are slightly outwardly flared and said flange means extend generally perpendicularly therefrom toward one another.

14. A snap-locking structural joint assembly as in claim 13, wherein said channel means includes a pair of channels extending at right angles to one another at each corner and opening outwardly beyond the adjacent edge of said flat side walls.

15. A snap-locking structural joint assembly as in claim 14, wherein each of said flange means is received in a respective one of said pair of channels at each opposite edge of one of said flat side walls.

16. A snap-locking structural joint assembly as in claim 15, wherein said legs of said U-shaped fastening clip are deflected inwardly toward one another when said second structural member is placed thereover.

17. A snap-locking structural joint assembly as in claim 16, wherein said separate fastening means comprises a pair of screws extended through a pair of opposite flat sides of said second structural member and through the legs of said fastening clip means.

* * * * *